United States Patent
Nishi (10) Patent No.: US 8,483,054 B2
(45) Date of Patent: Jul. 9, 2013

(54) COMMUNICATION PATH ESTIMATION METHOD, NON-TRANSITORY COMPUTER-READABLE RECORDING MEDIUM, AND MONITORING APPARATUS

(75) Inventor: Tetsuya Nishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 287 days.

(21) Appl. No.: 13/029,484

(22) Filed: Feb. 17, 2011

(65) Prior Publication Data

US 2011/0235521 A1    Sep. 29, 2011

(30) Foreign Application Priority Data

Mar. 29, 2010    (JP) ................................. 2010-074475

(51) Int. Cl.
*H04L 12/26* (2006.01)
*H04L 12/56* (2006.01)

(52) U.S. Cl.
USPC ............ 370/229; 370/248; 370/250; 370/401

(58) Field of Classification Search
None
See application file for complete search history.

(56) References Cited

U.S. PATENT DOCUMENTS

| | | | |
|---|---|---|---|
| 2003/0137930 A1* | 7/2003 | Futernik | 370/216 |
| 2003/0147352 A1* | 8/2003 | Ishibashi et al. | 370/248 |
| 2004/0190445 A1* | 9/2004 | Dziong et al. | 370/225 |
| 2005/0259571 A1* | 11/2005 | Battou | 370/217 |
| 2005/0276251 A1* | 12/2005 | Biddiscombe et al. | 370/338 |
| 2007/0286069 A1* | 12/2007 | Xu | 370/218 |
| 2008/0285442 A1* | 11/2008 | Bruckman et al. | 370/225 |
| 2009/0161531 A1* | 6/2009 | Chen | 370/216 |

FOREIGN PATENT DOCUMENTS

JP    2008-061139 A    3/2008

* cited by examiner

*Primary Examiner* — Chi Pham
*Assistant Examiner* — Soon-Dong D Hyun
(74) *Attorney, Agent, or Firm* — Fujitsu Patent Center (57) ABSTRACT

A communication path estimation method for estimating a communication path in a network in which communication is performed by forwarding packets from a plurality of transmission source nodes to a plurality of transmission destination nodes through a plurality of nodes, the method has obtaining, by a computer, path information of a plurality of paths, extracting a path in which a number of lost packets out of packets flowing in the extracted path is a predetermined value or more on the basis of the path information, choosing a pair of adjacent nodes included in the extracted path, and outputting a hypothesis that a static path is set from a first downstream node to a second downstream node when the first downstream node being included in a plurality of paths connected to a plurality of destination nodes and a first upstream node is the same with a second upstream node.

6 Claims, 13 Drawing Sheets

| TRANSMISSION SOURCE SUB-NETWORK INFORMATION 402 | TRANSMISSION DESTINATION SUB-NETWORK INFORMATION 404 | PATH INFORMATION 406 |
|---|---|---|
| 10.0.0.0/8 | 12.0.0.0/8 | A→C→D→E→G |
| 10.0.0.0/8 | 13.0.0.0/8 | A→C→D→F→H |
| 11.0.0.0/8 | 12.0.0.0/8 | B→C→D→E→G |
| 11.0.0.0/8 | 13.0.0.0/8 | B→C→D→F→H |

| | L1 | L2 | L3 | L4 | L5 | L6 | L7 |
|---|---|---|---|---|---|---|---|
| FLOW 1 (NORMAL) ↕ | OK | OK | - | - | - | - | - |
| FLOW 2 (ABNORMAL) ⋮ | - | NG | NG | - | - | - | NG |
| FLOW 3 (NORMAL) ↕ | - | - | - | - | - | OK | - |
| FLOW 4 (ABNORMAL) ↕ | - | NG | NG | NG | - | - | - |
| ABNORMALITY ISOLATION DIAGNOSIS | NORMAL | NORMAL | ABNORMAL | ABNORMAL | NORMAL | NORMAL | ABNORMAL |

FIG. 6

| Transmission Source IP Address | Transmission Destination IP Address | Number of Packets Transmitted | Number of Packets Received | Number of Packets Lost on Transmission Side | Number of Packets Lost on Reception Side | Quality Analysis Result |
|---|---|---|---|---|---|---|
| 10.1.1.11 | 12.1.1.11 | 10000 | 10000 | 99 | 99 | × |
| 10.1.1.12 | 12.1.1.12 | 9000 | 9000 | 89 | 89 | × |
| 10.1.1.13 | 14.1.1.13 | 10500 | 10500 | 102 | 102 | × |
| 10.1.1.14 | 14.1.1.14 | 11000 | 11000 | 100 | 100 | × |
| 10.1.1.15 | 13.1.1.15 | 9500 | 9500 | 90 | 90 | × |
| 10.1.1.16 | 13.1.1.16 | 10200 | 10200 | 95 | 95 | × |
| 10.1.1.17 | 15.1.1.17 | 11500 | 11500 | 110 | 110 | × |
| 10.1.1.18 | 15.1.1.18 | 8500 | 8500 | 80 | 80 | × |
| 10.1.1.19 | 16.1.1.19 | 10000 | 10000 | 0 | 0 | ○ |
| 10.1.1.20 | 16.1.1.20 | 10500 | 10500 | 0 | 0 | ○ |
| 11.1.1.21 | 17.1.1.21 | 9500 | 9500 | 0 | 0 | ○ |
| 11.1.1.22 | 17.1.1.22 | 11000 | 11000 | 0 | 0 | ○ |

FIG. 7

| TRANSMISSION SOURCE SUB-NETWORK INFORMATION 802 | TRANSMISSION DESTINATION SUB-NETWORK INFORMATION 804 | SEARCH PATH CANDIDATE INFORMATION 806 |
|---|---|---|
| 10.0.0.0/8 | 12.0.0.0/8 | X |
| 10.0.0.0/8 | 14.0.0.0/8 | X |
| 10.0.0.0/8 | 13.0.0.0/8 | Y |
| 11.0.0.0/8 | 12.0.0.0/8 | X |
| 11.0.0.0/8 | 15.0.0.0/8 | X |

| TRANSMISSION SOURCE SUB-NETWORK INFORMATION | TRANSMISSION DESTINATION SUB-NETWORK INFORMATION | PATH INFORMATION |
|---|---|---|
| 10.0.0.0/8 | 12.0.0.0/8 | A→C→K→D→E→G |
| 10.0.0.0/8 | 14.0.0.0/8 | A→C→K→D→E→I |
| 10.0.0.0/8 | 13.0.0.0/8 | A→C→K→D→F→H |
| 11.0.0.0/8 | 12.0.0.0/8 | B→C→K→D→E→G |
| 11.0.0.0/8 | 15.0.0.0/8 | B→C→K→D→E→J |

COMMUNICATION PATH ESTIMATION METHOD, NON-TRANSITORY COMPUTER-READABLE RECORDING MEDIUM, AND MONITORING APPARATUS

CROSS-REFERENCE TO RELATED APPLICATION

This application is based upon and claims the benefit of priority of the prior Japanese Patent Application No. 2010-074475, filed on Mar. 29, 2010, the entire contents of which are incorporated herein by reference.

FIELD

The present art relates to a communication path estimation method, a communication path estimation program, and a monitoring apparatus for a network.

BACKGROUND

It is important to be able to perform path identification for a network for the following purposes: in the case of an Internet Protocol (IP) network, for example, to check whether a path that was set during the design of the network corresponds to an actual path; and in the case of a service such as Voice over Internet Protocol (VoIP), to find out, after occurrence of a quality deterioration, which path an influential flow passes through and to check, when performing a network reconstruction, whether a path is appropriately bypassed so that the service will not be affected. In order to perform path control for an IP network, for example, an Open Shortest Path First (OSPF) protocol is used. In the OSPF protocol, path control information called "link-state advertisements (LSAs)" is exchanged between routers that form a network. By exchanging LSAs between routers, a routing table is constructed to perform path control for an IP network.

There may be a case in which, for example, in order to perform load distribution or the like in a network subjected to path control performed using the OSPF protocol, a path that is different from a path set using the OSPF protocol is statically set for a particular sub-network. Path information that has been statically set does not appear on the network in the form of LSAs of the OSPF protocol. Therefore, with an apparatus that monitors a path by obtaining LSAs in a similar manner to a router, only path information relating to a network set using the OSPF protocol can be obtained, and path information relating to a network that is actually managed cannot be obtained. For this reason, when performing a path identification for a network, it is important to obtain path information concerning a path that is statically set and match the path information to path information relating to a network that is actually managed.

In order to obtain statically set path information, to date, for example, the following has been performed: a management information base (MIB) of routing tables of all routers has been obtained; a check using a command has been performed after login; or tracing of a path has been executed between source and destination addresses and the results have been compared with the calculation results in the OSPF protocol so as to find out a different path. In these methods, because entries of routing tables of all routers need to be found or paths of all source and destination flows need to be traced and checked, a router that cannot be accessed, if any, cannot be detected or the check may take time to execute tracing for all the source and destination flows.

Japanese Laid-open Patent Publication No. 2008-061139 is an example of related art.

SUMMARY

According to an aspect of an invention, a communication path estimation method for estimating a communication path in a network in which communication is performed by forwarding packets from a plurality of transmission source nodes to a plurality of transmission destination nodes through a plurality of nodes, the method has obtaining, by a computer, path information of a plurality of paths connecting the plurality of transmission source nodes and the plurality of transmission destination nodes on the basis of connection information generated by the plurality of nodes that have transmitted and received information relating to a node connected to the respective plurality of nodes to/from one another, extracting a path in which a number of lost packets out of packets flowing in the extracted path is a predetermined value or more on the basis of the path information, choosing a pair of adjacent nodes included in the extracted path, the pair of adjacent nodes being an upstream node and a downstream node and being assumed to have an abnormal point therebetween, and outputting a hypothesis that a static path is set from a first downstream node to a second downstream node when the first downstream node being included in a plurality of paths connected to a plurality of destination nodes and a first upstream node is the same with a second upstream node, the first upstream node and the first downstream node being included in a first path, the second upstream node and the second downstream node being included in a second path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
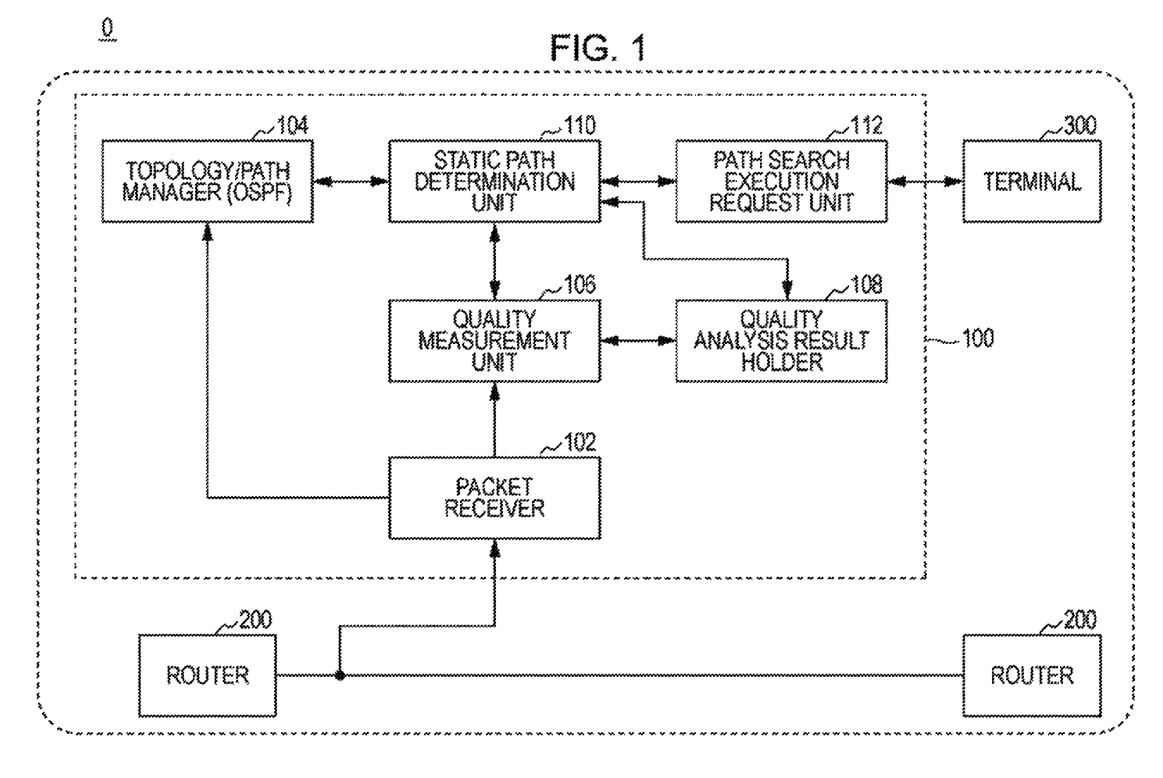
FIG. 1 is a diagram illustrating a path monitoring system.

FIG. 1 is a diagram illustrating a path monitoring system 0 according to an embodiment of the present art. The path monitoring system 0 has a plurality of routers 200, a path monitoring apparatus 100 that analyses packets flowing between the routers 200, and a terminal 300.

The path monitoring apparatus 100 has a packet receiver 102, a topology/path manager 104, a quality measurement unit 106, a quality analysis result holder 108, a static path determination unit 110, and a path search execution request unit 112.

The packet receiver 102 is connected to an arbitrary point in a network and receives all IP packets including LSAs of an OSPF protocol.

The topology/path manager 104 obtains LSAs from the packet receiver 102. The topology/path manager 104 manages information concerning connection between the routers 200 and path information of each flow from the obtained LSAs. The topology/path manager 104 creates a routing table.

Figure 2:
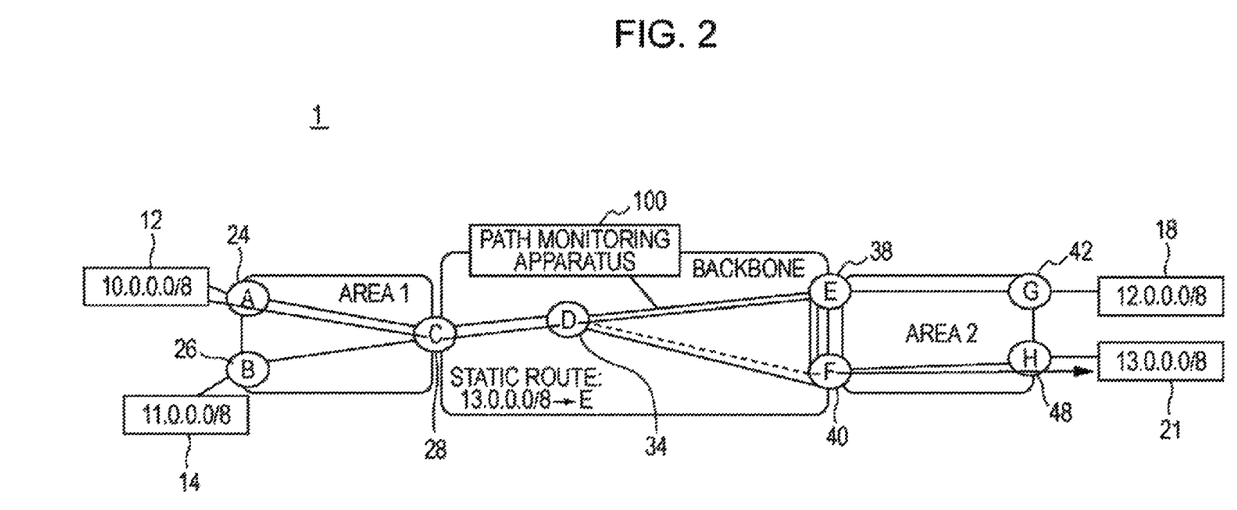
FIG. 2 is a diagram for describing a routing table.
Figure 3:
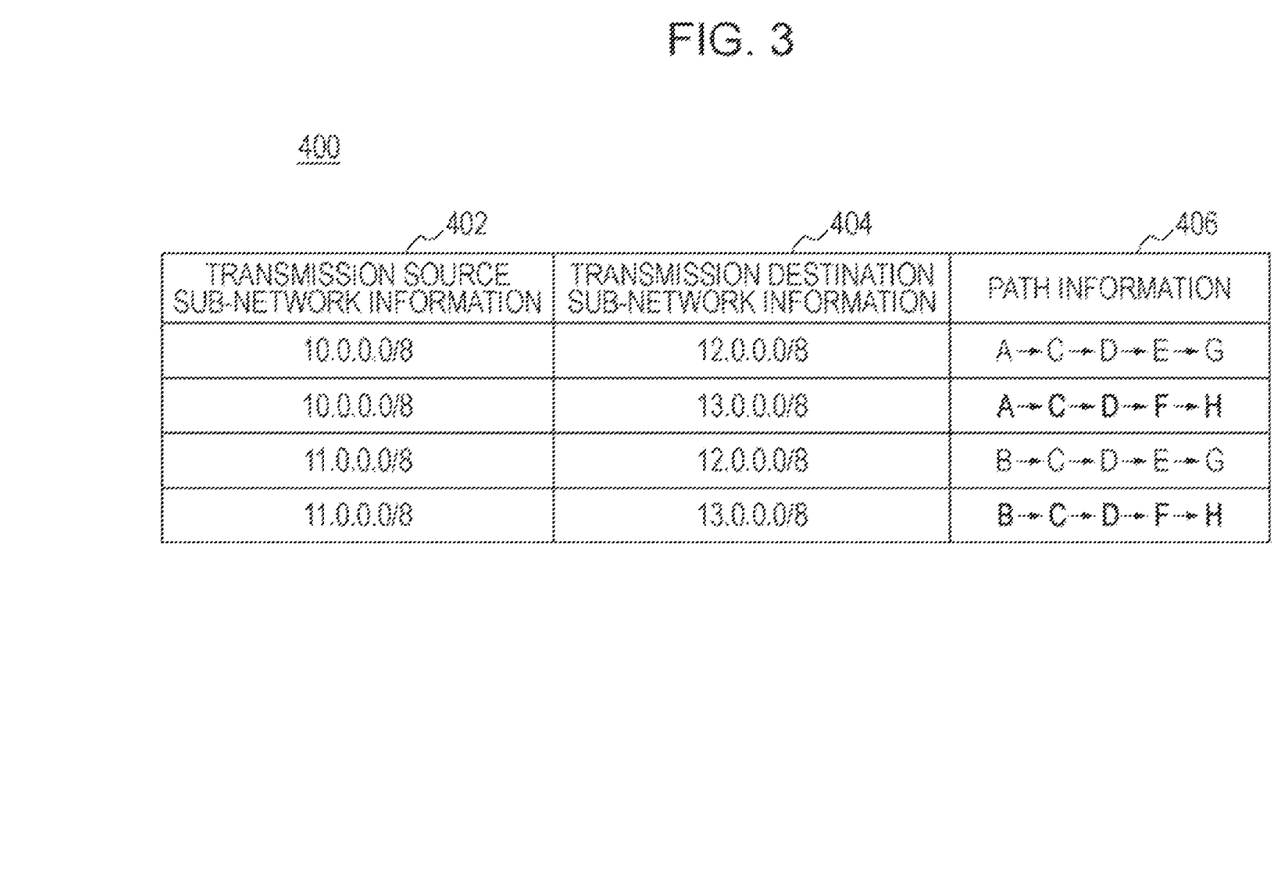
FIG. 3 is a diagram illustrating the routing table.

A routing table according to this embodiment is described here with reference to FIGS. 2 and 3. As illustrated in FIG. 2, a network system 1 has a transmission source sub-network 12, a transmission source sub-network 14, a transmission destination sub-network 18, and a transmission destination sub-network 21.

A router A 24 is connected to the transmission source sub-network 12, and a router B 26 is connected to the transmission source sub-network 14. A router C 28 is connected to the router A 24 and the router B 26. The router A 24, the router B 26, and the router C 28 form Area 1.

A router D 34 is connected to the router C 28. A router E 38 and a router F 40 are connected to the router D 34. The router C 28, the router D 34, the router E 38, and the router F 40 form a backbone.

A router G 42 is connected to the router E 38. The transmission destination sub-network 18 is connected to the router G 42. A router H 48 is connected to the router F 40. The transmission destination sub-network 21 is connected to the router H 48. The router E 38, the router F 40, the router G 42, and the router H 48 form Area 2.

The above-mentioned LSAs are generated by the routers and transmitted to respective adjacent routers. For example, the router C 28 transmits LSAs to the router A 24, the router B 26, and the router D 34. In addition, the router D 34 transmits LSAs to the router C 28, the router E 38, and the router F 40. The router C 28 refers to the LSA transmitted from the router D 34 to verify that the router E 38 and the router F 40 are connected to the router D 34. The router C 28 then adds information relating to the router E 38 and the router F 40, both of which are connected to the router D 34, to the LSAs generated thereby. Thus, the routers update LSAs that are generated thereby and transmitted to adjacent routers. The path monitoring apparatus 100 generates a routing table by obtaining the updated LSAs.

A routing table 400 illustrated in FIG. 3 has transmission source sub-network information 402, transmission destination sub-network information 404, and path information 406. In the path information 406, passing routers provided along a path from a transmission source sub-network to a transmission destination sub-network are described.

The quality measurement unit 106 categorizes packets obtained from the packet receiver 102 into flows of corresponding source and destination IP addresses. The quality measurement unit 106 measures the quality of each flow and identifies a quality deterioration point from the relationship between flows whose quality has deteriorated. The quality measurement unit 106 then stores the analysis results of the flows in the quality analysis result holder 108. If there is a quality deterioration point, the quality measurement unit 106 notifies the static path determination unit 110 of the quality deterioration point.

A method for estimating a quality deterioration point according to this embodiment is described with reference to FIGS. 4 and 5. A network system 2 illustrated in FIG. 4 has a plurality of sub-networks 902, 904, 906, 908, and 910. The sub-network 902 is connected to a router 912. The router 912 is connected to a router 914. The router 914 is connected to a router 916 and a router 920. The router 916 is connected to the sub-network 910 and a router 922. The sub-network 904 is connected to a router 918. The router 918 is connected to the router 920. The router 920 is connected to a router 924 and the router 922. The router 922 is connected to the sub-network 908. The sub-network 906 is connected to the router 924.

Figure 4:
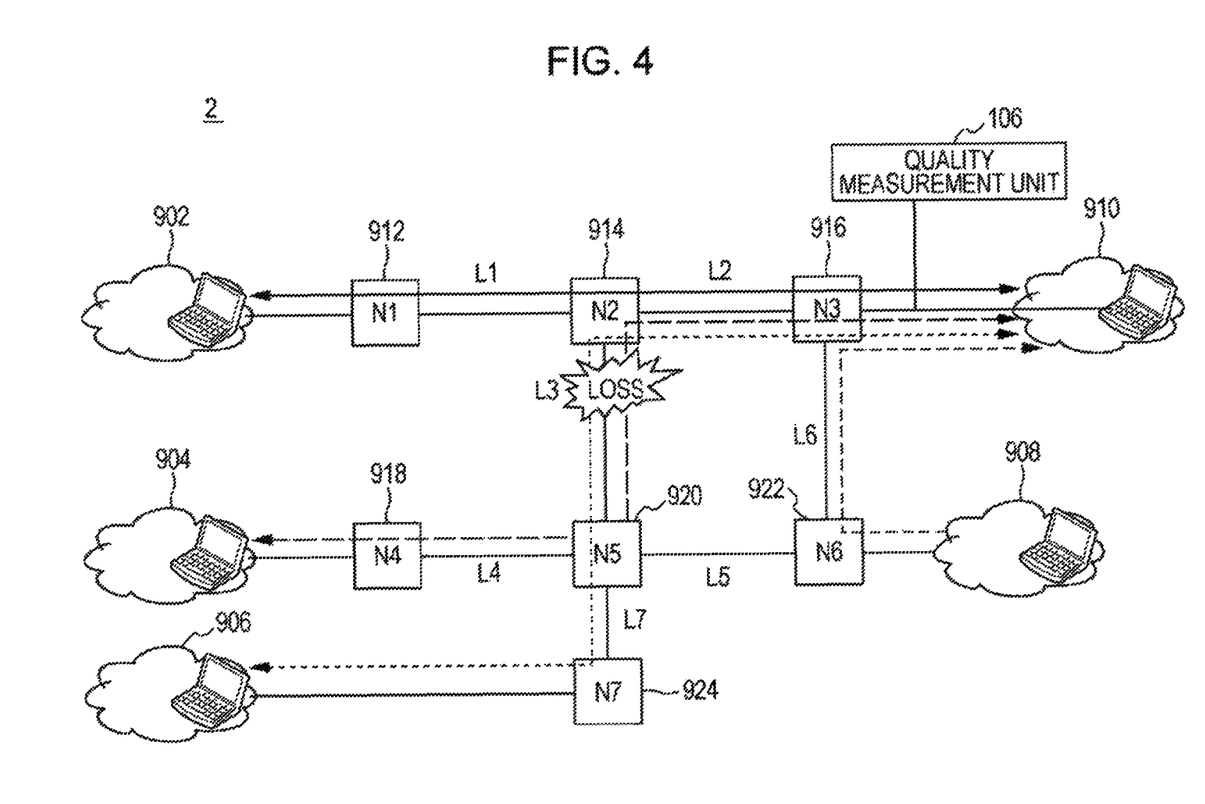
FIG. 4 is a first diagram illustrating a method for estimating a quality deterioration point.
Figure 5:
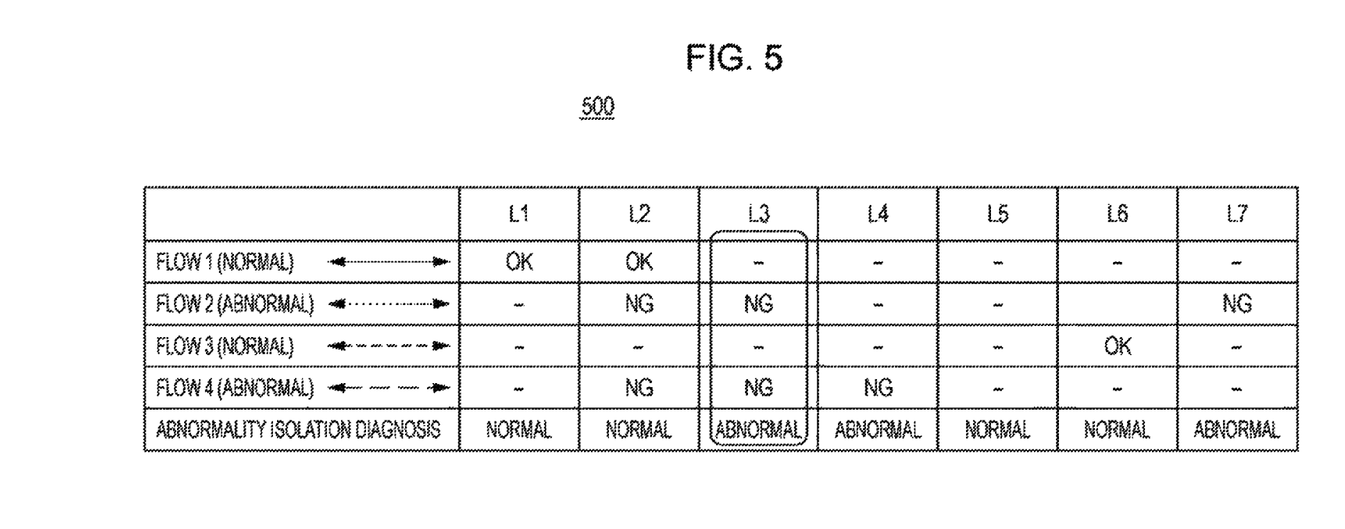
FIG. 5 is a second diagram illustrating the method for estimating a quality deterioration point.

Now, suppose that a quality deterioration occurs at a link L3 illustrated in FIG. 4. The quality measurement unit 106 receives traffic flows of Flow 1, Flow 2, Flow 3, and Flow 4 and measures the quality of the traffic flows. The path of Flow 1 runs from N1 to L1, N2, L2, and then to N3. The path of Flow 2 runs from N7 to L7, N5, L3, N2, L2, and then to N3. The path of Flow 3 runs from N6 to L6 and then to N3. The path of Flow 4 runs from N4 to L4, N5, L3, N2, L2, and then to N3. The quality measurement unit 106 performs mapping for these flows so as to indicate whether each flow has been normal or abnormal at links through which the flow passed as in a tomography analysis table 500 illustrated in FIG. 5. The quality measurement unit 106 refers to this table and, if flows that passed through a shared link (L3 in this case) are all abnormal, identifies the link as a quality deterioration point. The links L4 and L7 may also be abnormal links here, but because the links L4 and L7 are also highly likely to be abnormal when the link L3, through which both Flow 2 and Flow 4 pass in this embodiment, is an abnormal link, the link L3 located upstream from the viewpoint of the quality measurement unit 106 is determined as a quality deterioration point.

In this embodiment, the types of packet include, for example, an IP packet, a Transmission Control Protocol (TCP) packet, a User Data Protocol (UDP) packet, and a Real-time Transport Protocol (RTP) packet. Upon determination of a quality deterioration, the quality measurement unit 106 finds packet loss by checking the ID field of an IP packet, the sequence number of a TCP packet, or, in the case of a UDP packet, lack of the sequence number of an RTP packet.

Figure 6:
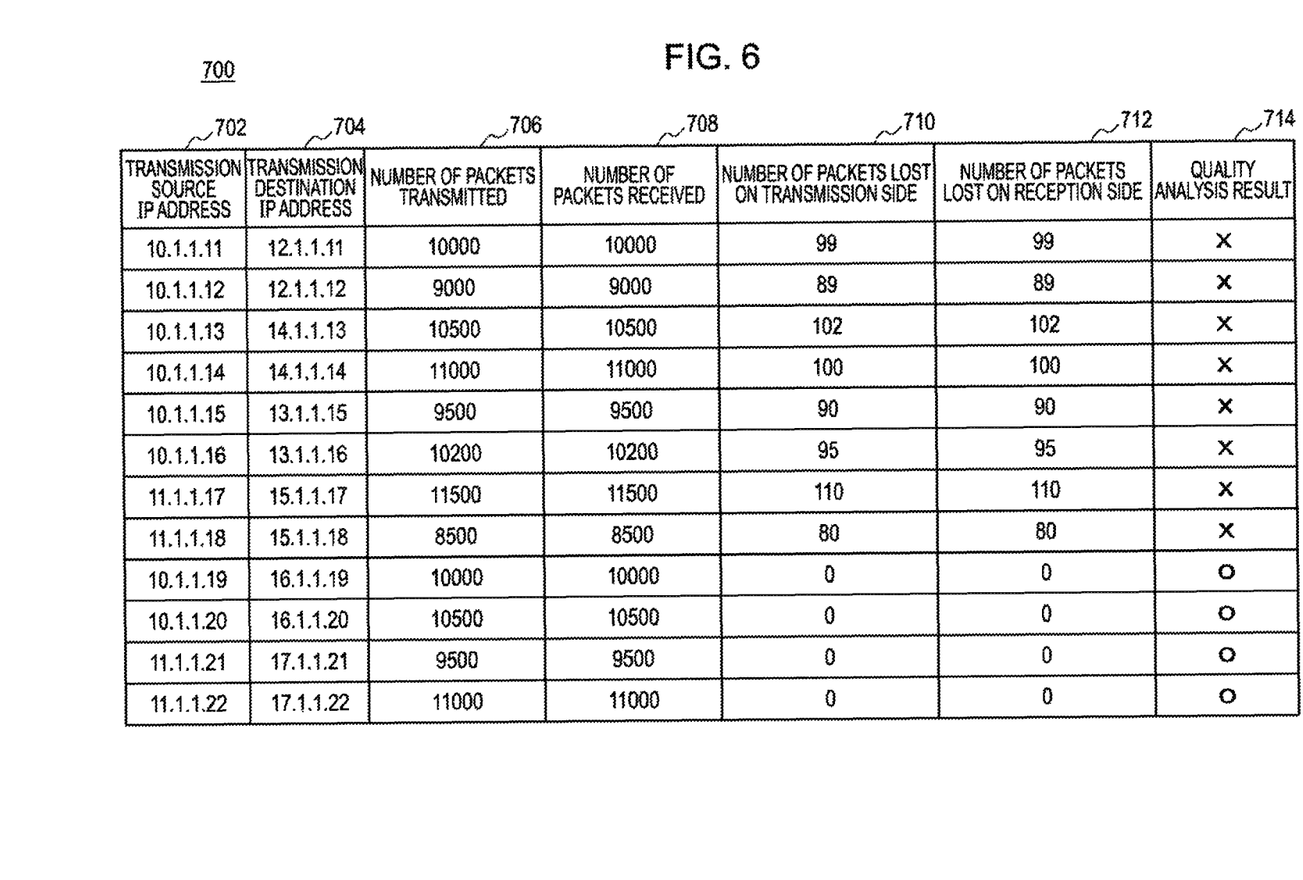
FIG. 6 is a diagram illustrating a quality measurement result database.

FIG. 6 is a diagram illustrating a quality measurement result database 700 that is stored in the quality analysis result holder 108. The quality measurement result database 700 includes a transmission source IP address 702, a transmission destination IP address 704, the number of packets transmitted 706, the number of packets received 708, the number of packets lost on the transmission side 710, the number of packets lost on the reception side 712, and a quality analysis result 714.

The transmission source IP address 702 indicates the IP address of a transmission source network. The transmission destination IP address 704 indicates the IP address of a transmission destination network. The number of packets transmitted 706 indicates the number of request packets that passed through, from a transmission source network to a transmission destination network, a link to which the path monitoring apparatus 100 is connected. The number of packets received 708 indicates the number of response packets that passed through, from a transmission destination network to a transmission source network, a link to which the path monitoring apparatus 100 is connected. The number of packets lost on the transmission side 710 indicates the number of packets that lacked their respective sequence numbers or the like among the request packets that passed through, from a transmission source network to a transmission destination network, a link to which the path monitoring apparatus 100 is connected. The number of packets lost on the reception side 712 indicates the number of packets that lacked their respective sequence numbers or the like among the response packets that passed through, from a transmission destination network to a transmission source network, a link to which the path monitoring apparatus 100 is connected. The quality analysis result 714 indicates a flow whose packet loss was large with a cross (x) and a flow whose packet loss was small with a circle (o).

The static path determination unit 110 receives a notification of a quality deterioration point from the quality measurement unit 106. The static path determination unit 110 obtains the flows whose quality has deteriorated from the quality analysis result holder 108 on the basis of the notification of the quality deterioration point. The static path determination unit 110 categorizes the flows obtained from the quality analysis result holder 108 into flows that are determined on a sub-network-by-sub-network basis and executes quality measurement again after removing flows to a particular transmission destination sub-network. After executing this process on all transmission destination sub-networks, the static path determination unit 110 determines a transmission destination sub-network with which the quality deterioration point has changed as a candidate for a static path. The static path determination unit 110 then makes the path search execution request unit 112 execute a path search that uses traceroute or the like. If path information is found to be different from that held in a routing table by this execution of a path search, the routing table is updated and a router located immediately before a point at which the paths become different is determined as a setting router for the static path.

The path search execution request unit 112 executes a path search that uses traceroute or the like on a particular route between transmission source and transmission destination networks upon receiving an instruction from the static path determination unit 110. In addition, the path search execution request unit 112 requests a transmission source terminal of a path to execute a path search. By requesting execution of a path search only on a particular path, the static path can be identified in a short period of time.

Figure 7:
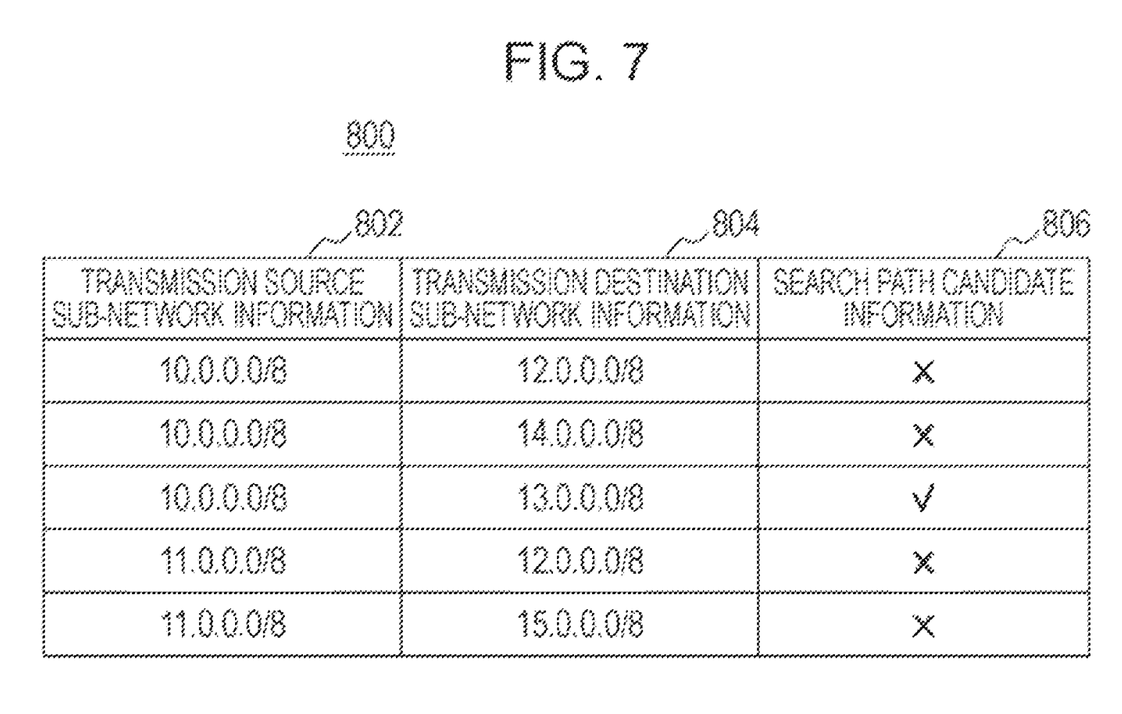
FIG. 7 is a diagram illustrating a search path candidate storage table.

FIG. 7 illustrates a search path candidate storage table 800 in the static path determination unit 110 according to this embodiment. The search path candidate storage table 800 has transmission source sub-network information 802, transmission destination sub-network information 804, and search path candidate information 806. After obtaining the flows whose quality has deteriorated from the quality analysis result holder 108, the static path determination unit 110 categorizes these flows into flows that are determined on a transmission-sub-network-by-transmission-sub-network basis and on a destination-sub-network-by-destination-sub-network basis, and registers the flows. On the basis of these transmission source and transmission destination sub-networks, the static path determination unit 110 selects transmission destination sub-networks to be removed and removes the selected transmission destination sub-networks, and makes the quality measurement unit 106 execute quality measurement and a process for estimating the quality deterioration point again. This process is executed for all combinations with one of the transmission destination sub-networks removed, and an entry in which the quality deterioration point has changed is registered as a candidate for a search path. By using this result, the static path determination unit 110 is able to estimate a path with which a path search is executed.

Figure 8:
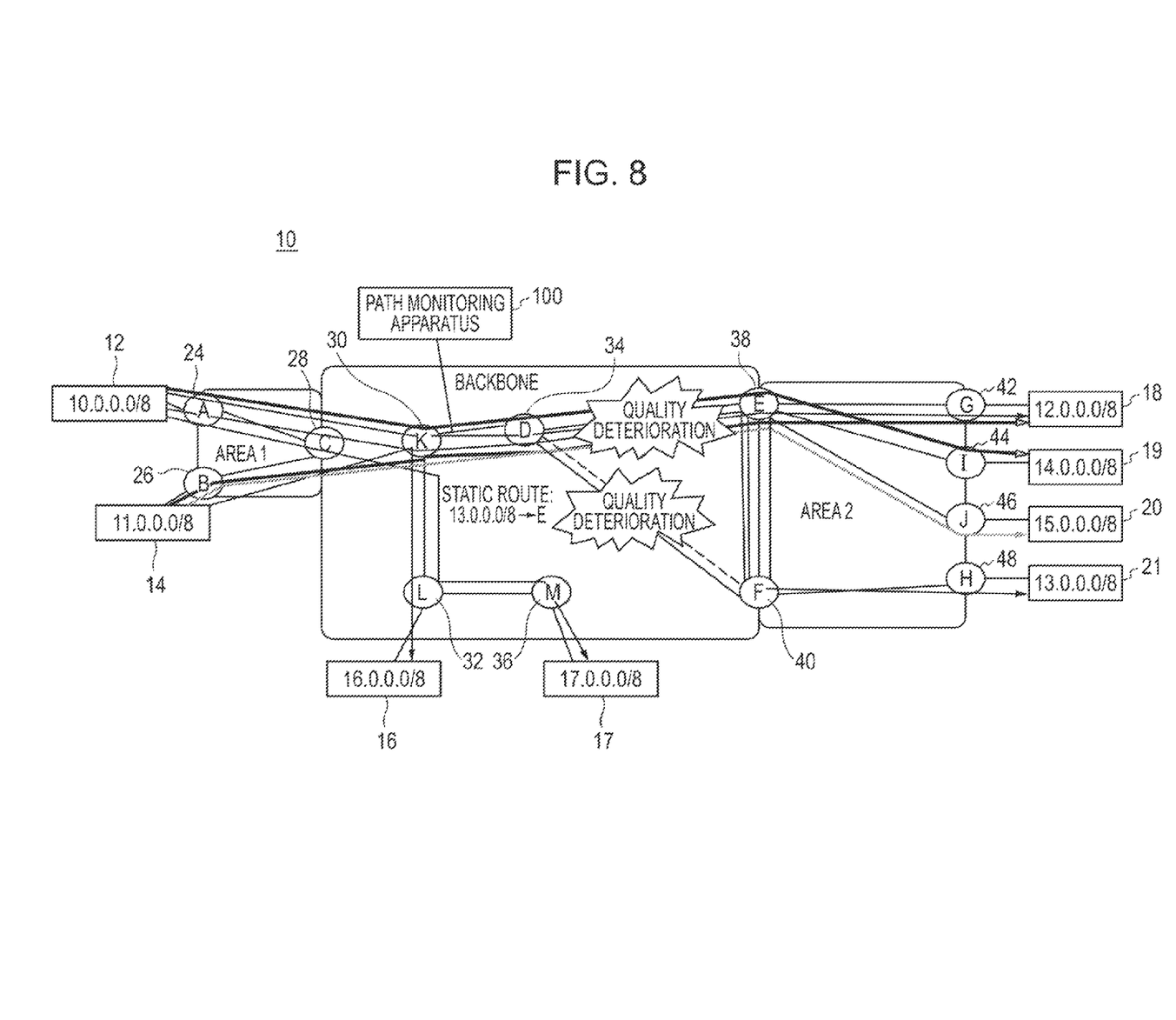
FIG. 8 is a diagram illustrating a principle configuration of a method for estimating a static path.

FIG. 8 is a diagram illustrating the principle configuration of a method for estimating the static path according to this embodiment. As illustrated in FIG. 8, a network system 10 has the transmission source sub-network 12, the transmission source sub-network 14, a transmission destination sub-network 16, a transmission destination sub-network 17, the transmission destination sub-network 18, a transmission destination sub-network 19, a transmission destination sub-network 20, and the transmission destination sub-network 21. The path monitoring apparatus 100 has the quality analysis result holder 108 and the static path determination unit 110. The quality analysis result holder 108 has the quality measurement result database 700 described with reference to FIG. 6, and the static path determination unit 110 has the search path candidate storage table 800 described with reference to FIG. 7.

The router A 24 is connected to the transmission source sub-network 12, and the router B 26 is connected to the transmission source sub-network 14. The router C 28 is connected to the router A 24 and the router B 26. The router A 24, the router B 26, and the router C 28 form Area 1.

A router K 30 is connected to the router C 28. A router L 32 and the router D 34 are connected to the router K 30. The transmission destination sub-network 16 and a router M 36 are connected to the router L 32. The transmission destination sub-network 17 is connected to the router M 36. The router E 38 and the router F 40 are connected to the router D 34. The router C 28, the router K 30, the router L 32, the router M 36, the router D 34, the router E 38, and the router F 40 form a backbone.

The router G 42, a router I 44, and a router J 46 are connected to the router E 38. The transmission destination sub-network 18 is connected to the router G 42. The transmission destination sub-network 19 is connected to the router I 44. The transmission destination sub-network 20 is connected to the router J 46. The router H 48 is connected to the router F 40. The transmission destination sub-network 21 is connected to the router H 48. The router E 38, the router F 40, the router G 42, the router I 44, the router J 46, and the router H 48 form Area 2.

In this embodiment, first, the quality measurement unit 106 determines that there are quality deterioration points in a link between the router D 34 and the router E 38 and a link between the router D 34 and the router F 40 as illustrated in FIG. 8. The quality measurement unit 106 does not determine a link between the router K 30 and the router D 34, which is a link located upstream of the link between the router D 34 and the router E 38 and the link between the router D 34 and the router F 40, but determines the link between the router D 34 and the router E 38 and the link between the router D 34 and the router F 40 as quality deterioration points. It is to be noted that although flows categorized on a sub-network-by-sub-network basis are illustrated for convenience of description, there are flows associated with a plurality of source and destination IP addresses in practice. It is also to be noted that, regarding the router D34, a static path is set for the transmission destination sub-network 21 so that packets in the router D 34 are forwarded to the router E 38 here.

According to path calculation results obtained by using LSAs of the OSPF protocol, a path from the transmission source sub-network 12 to the transmission destination sub-network 21 is relayed from the router D 34 to the router F 40. Therefore, although a flow from the transmission source sub-network 12 to the transmission destination sub-network 21 also passes through a quality deterioration link in practice, which causes a quality deterioration in packets therein, the flow is regarded as passing through a link that connects the router D 34 and the router F 40 in the path calculation results obtained by using LSAs of the OSPF protocol. As a result, the quality measurement unit 106 incorrectly determines that the quality deterioration point is a link between the router K 30 and the router D 34.

Figure 9:
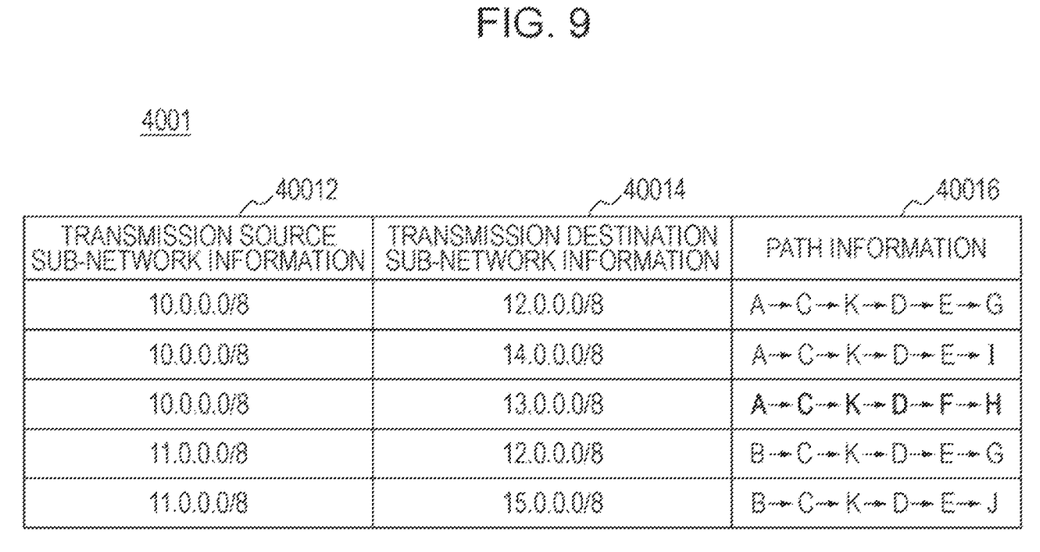
FIG. 9 is a diagram illustrating a routing table corresponding to FIG. 8.

The topology/path manager 104 creates a routing table 4001 illustrated in FIG. 9 from the obtained LSAs. The routing table 4001 has transmission source sub-network information 40012, transmission destination sub-network information 40014, and path information 40016. The topology/path manager 104 obtains the path information of the network system 10. From the routing table 4001 created by the topology/path manager 104, the static path determination unit 110 determines that the router G 42, the router I 44, and the router J 46 are connected to the router E 38, and the router H 48 is connected to the router F 40. As illustrated in FIG. 8, when a plurality of routers are connected to the router E 38 and, in contrast, a single router is connected to the router F 40, the thickness of a link connecting the router D 34 and the router E 38 is estimated to be larger than that of the link connecting the router D 34 and the router F 40. In such a case, a path may be statically set to be relayed from the router D 34 to the router E 38 so as to increase the reliability of packet transmission by passing through a thick link. The static path determination unit 110 estimates that the router E 38 is statically set.

Figure 10:
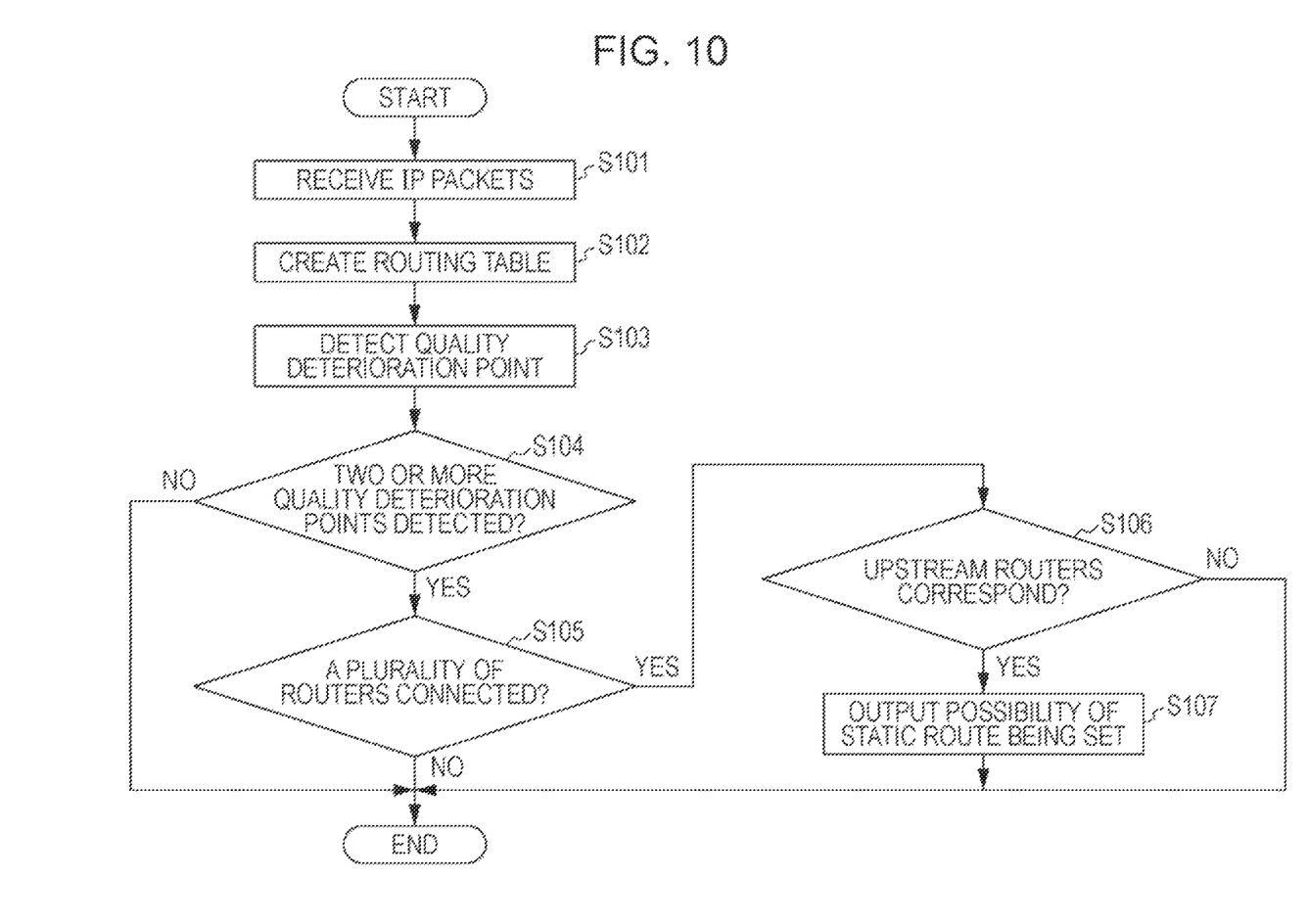
FIG. 10 is a flowchart illustrating a process according to an embodiment.

FIG. 10 is a flowchart illustrating a method for estimating a static path according to this embodiment.

In step S101, the packet receiver 102 receives all IP packets including LSAs of the OSPF protocol. The process proceeds to step S102.

In step S102, the topology/path manager 104 creates a routing table on the basis of the LSAs obtained from the packet receiver 102. The process proceeds to step S103.

In step S103, the quality measurement unit 106 measures the quality of each flow and detects a quality deterioration point. The process proceeds to step S104.

In step S104, the static path determination unit 110 determines whether or not at least two or more quality deterioration points have been detected. If at least two or more quality deterioration points have been detected, the process proceeds to step S105. On the other hand, if at least two or more quality deterioration points have not been detected, the process terminates.

In step S105, the static path determination unit 110 refers to the routing table to determine whether or not a plurality of routers are connected to a router located downstream of a detected first quality deterioration point. If a plurality of routers are connected to a router located downstream of the first quality deterioration point, the process proceeds to step S106. In this embodiment, the first quality deterioration point is located between the router D 34 and the router E 38, and the router G 42, the router I 44, and the router J 46 are connected to the router E 38, which is a router located downstream of the quality deterioration point. On the other hand, if a plurality of routers are not connected to a router located downstream of the detected first quality deterioration point, the process terminates.

In step S106, the static path determination unit 110 refers to the routing table to determine whether or not a router located upstream of a detected second quality deterioration point corresponds to a router located upstream of the detected first quality deterioration point. In this embodiment, the second quality deterioration point is located between the router D 34 and the router F 40, and the router D 34, which is a router located upstream of the second quality deterioration point, is also a router located upstream of the first quality deterioration point. If a router located upstream of the detected second quality deterioration point corresponds to a router located upstream of the detected first quality deterioration point, the process proceeds to step S107. On the other hand, if a router located upstream of the detected second quality deterioration point does not correspond to a router located upstream of the detected first quality deterioration point, the process terminates.

In step S107, the static path determination unit 110 outputs an indication that it is possible that a static route is set for the router D 34. The process terminates.

Figure 11:
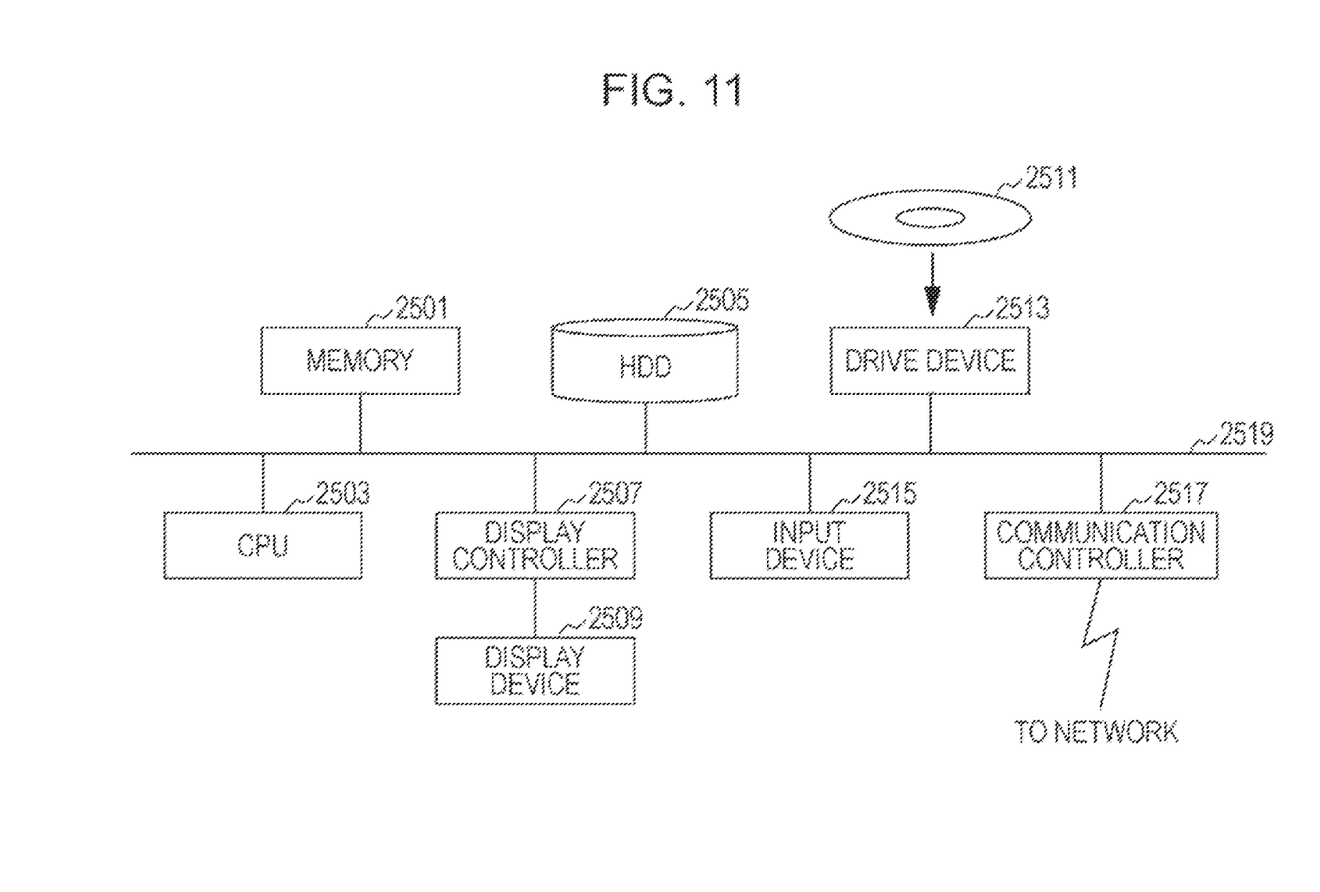
FIG. 11 is a diagram illustrating functional blocks of a computer.

As illustrated in FIG. 11, in a path monitoring system, a memory 2501 (storage unit), a central processing unit (CPU) 2503 (processor), a hard disk drive (HDD) 2505, a display controller 2507 connected to a display device 2509, a drive device 2513 for a removable disk 2511, an input device 2515, and a communication controller 2517 for connecting to a network are connected by a bus 2519. An operating system (OS) and application programs including a web browser are stored in the HDD 2505, and when executed by the CPU 2503, the OS and the application programs are read out to the memory 2501 from the HDD 2505. The CPU 2503 controls the display controller 2507, the communication controller 2517, and the drive device 2513 as necessary to cause the display controller 2507, the communication controller 2517, and the drive device 2513 to perform necessary operations. In addition, data being processed is stored in the memory 2501, and may be stored in the HDD 2505 as necessary. Such a computer realizes the various functions described above through organic and cooperative operation of hardware such as the CPU 2503 and the memory 2501, the OS, and necessary application programs, which are described above.

Figure 12:
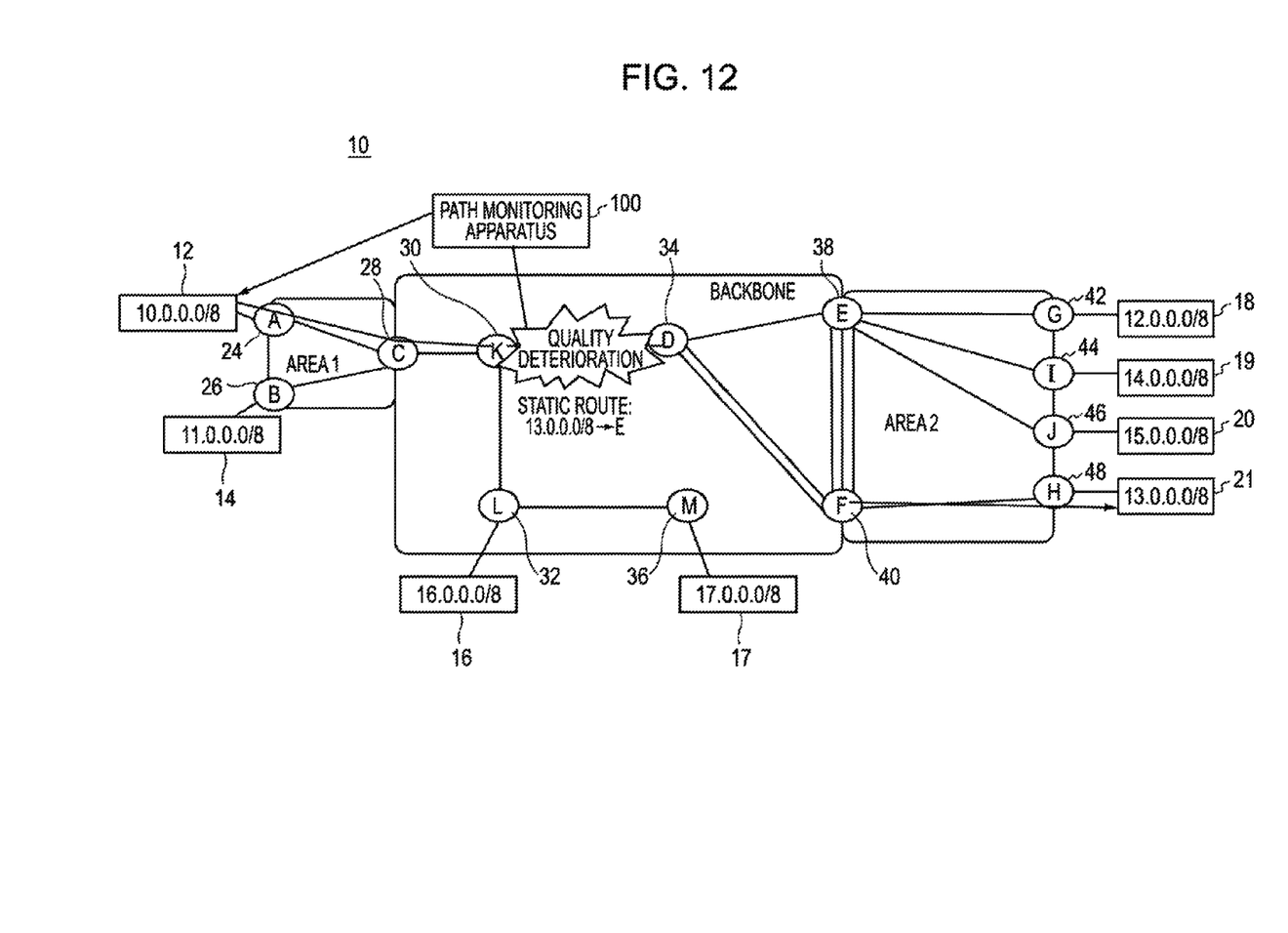
FIG. 12 is a first diagram illustrating an example of an operation in which an actual path is checked.

Finally, the effectiveness of this embodiment is described. FIG. 12 is a diagram illustrating an example of an operation in which it is supposed that a path for the transmission destination sub-network 21 is statically set, and traceroute is executed for a flow in the path in order to check an actual path. The path monitoring apparatus 100 logs in an arbitrary terminal of the transmission source sub-network 12 or the router A 24 using Telnet or the like and causes the terminal to execute a traceroute command.

After causing the terminal to execute traceroute, the path monitoring apparatus 100 receives response packets that have been sent back in response to traceroute at the packet receiver 102 and analyzes routers through which the response packets have passed on the basis of the transmission source IP addresses. Because the router D 34, the router E 38, the router F 40, and the router H 48 send back their respective response packets, a path can be identified from the transmission source IP addresses of the response packets. After the path is identified, if the path is different from one in a routing table, the routing table is modified. Since a path after the router D 34 is different here, it is determined that the path for the transmission destination sub-network 21 is statically set and setting of the path is performed at the router D 34.

Figure 13:
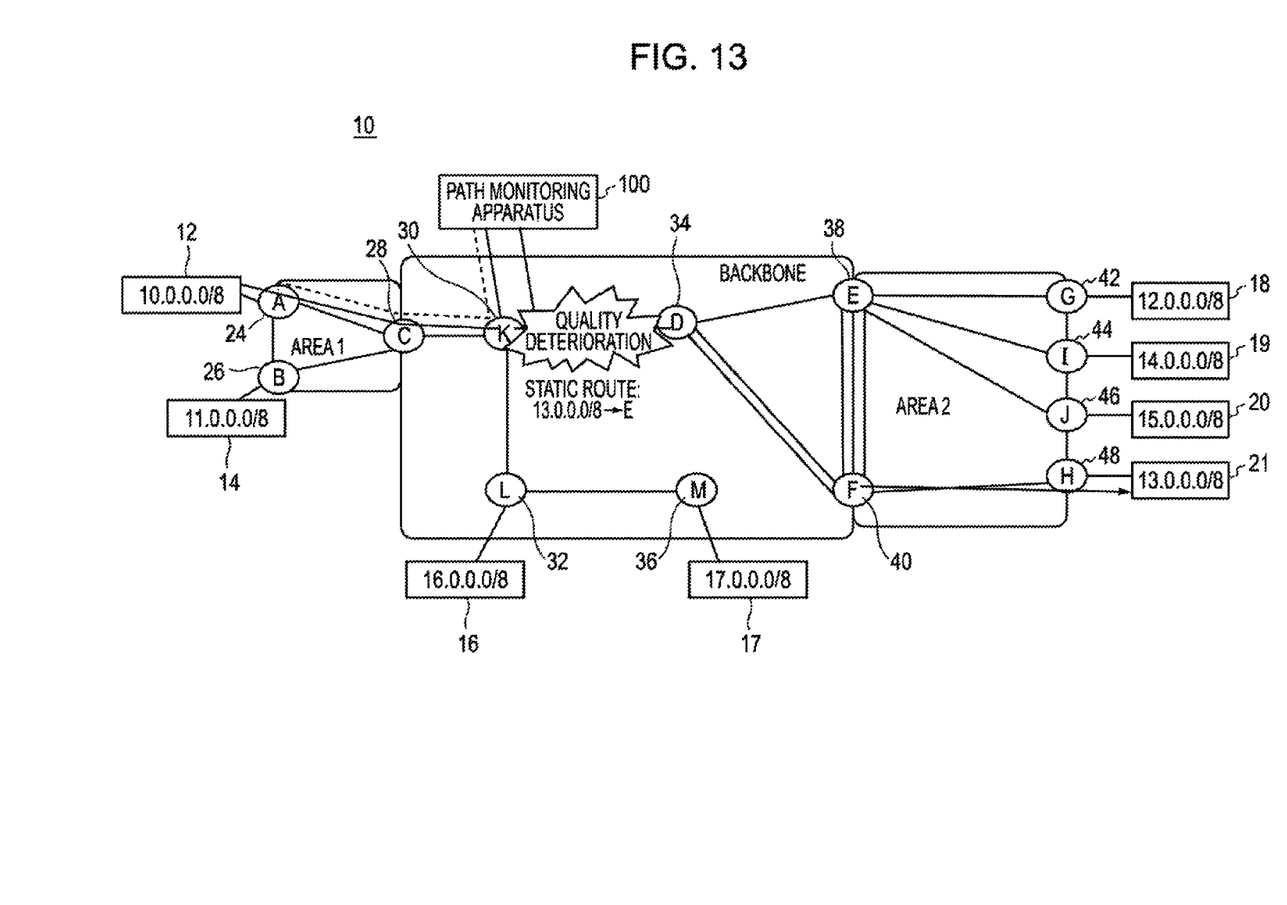
FIG. 13 is a second diagram illustrating another example of the operation in which an actual path is checked.

FIG. 13 is a diagram illustrating another example of an operation in which traceroute is executed for a candidate for a static path. In the example of the operation illustrated in FIG. 12, the path search execution request unit 112 requests a terminal of a sub-network of a target path to execute traceroute. However, in this example of the operation, traceroute is directly executed by the path monitoring system 0 using an option of traceroute for designating a relay router, and the path to the transmission destination sub-network 21 is searched for while a router of the transmission source sub-network 12 is passed through once. In doing so, path search can be realized even when a router or terminal of a subnetwork cannot be directly controlled.

In contrast to the examples of the operation illustrated in FIGS. 12 and 13, in this embodiment, it is not necessary to search or check routing tables of all the routers nor to execute traceroute for all the source and destination addresses, which successfully reduces the time taken by path search. In addition, since packets flowing in a network are monitored, it is possible to check a path even for, for example, a network having routers that cannot be accessed.

According to an aspect of the art, a statically set path in a network can be efficiently identified.

According to the wireless communication device and the method for wireless communication disclosed herewith, extension of a period of time required for data communication between nodes can be reduced in a wireless network to which a plurality of nodes belongs for carrying out ad hoc communication.

As mentioned above, the present invention has been specifically described for better understanding of the embodiments thereof and the above description does not limit other aspects of the invention. Therefore, the present invention can be altered and modified in a variety of ways without departing from the gist and scope thereof.

What is claimed is:

1. A communication path estimation method for estimating a communication path in a network in which communication is performed by forwarding packets from a plurality of transmission source nodes to a plurality of transmission destination nodes through a plurality of relaying nodes to relay the forwarding packets, the method comprising:
    obtaining, by a computer, path information of a plurality of paths connecting the plurality of transmission source nodes and the plurality of transmission destination nodes on the basis of a connection relationship between the plurality of relaying nodes;
    extracting a path in which a number of lost packets out of packets flowing in the extracted path is a given value or more on the basis of the path information;
    choosing a pair of adjacent nodes included in the extracted path, the pair of adjacent nodes being an upstream node and a downstream node and being assumed to have an abnormal point therebetween; and
    outputting a hypothesis that a static path is set from a first downstream node to a second downstream node when the first downstream node is included in a plurality of paths connected to a plurality of destination nodes and a first relaying node is also a second relaying node, the first relaying node being upstream of a first abnormal point, the second relaying node being upstream of the first abnormal point, the first relaying node and the first downstream node being included in a first path, the second relaying node and the second downstream node being included in a second path.

2. The communication path estimation method of claim 1, wherein the computer outputs the hypothesis when a node is further connected to the second downstream node.

3. A computer-readable, non-transitory medium storing a computer program causing a computer to execute a method for estimating a communication path in a network in which communication is performed by forwarding packets from a plurality of transmission source nodes to a plurality of transmission destination nodes through a plurality of relaying nodes to relay the forwarding packets, the method comprising:
    obtaining path information of a plurality of paths connecting the plurality of transmission source nodes and the plurality of transmission destination nodes on the basis of a connection relationship between the plurality of relaying nodes;
    extracting a path in which number of lost packets out of packets flowing in the extracted path is a given value or more on the basis of the path information;
    choosing a pair of adjacent nodes included in the extracted path, the pair of adjacent nodes being an upstream node and a downstream node and being assumed to have an abnormal point therebetween; and
    outputting a hypothesis that a static path is set from a first downstream node to a second downstream node when the first downstream node is included in a plurality of paths connected to a plurality of destination nodes and a first relaying node is also a second relaying node, the first relaying node being upstream of a first abnormal point, the second relaying node being upstream of the first abnormal point, the first relaying node and the first downstream node being included in a first path, the second relaying node and the second downstream node being included in a second path.

4. The computer-readable, non-transitory medium of claim 3, wherein the outputting outputs the hypothesis when a node is further connected to the second downstream node.

5. A monitoring apparatus that monitors a network in which communication is performed by forwarding packets from a plurality of transmission source nodes to a plurality of transmission destination nodes through a plurality of relaying nodes to relay the forwarding packets, the monitoring apparatus comprising:
    a memory that stores a plurality of pieces of path information for connecting the plurality of transmission source nodes and the plurality of transmission destination nodes on the basis of a connection relationship between the plurality of relaying nodes; and
    a processor that detects a plurality of path whose number of lost packets that flow in the plurality of paths is a certain value or more on the basis of the plurality of pieces of path information and configured to estimate a possibility of there being an abnormal point between nodes shared by the plurality of paths in which number of lost packets is the certain value or more, and outputs a hypothesis that it is possible that a static path is set from the node located on the downstream side of the first abnormal point to a node located on a downstream side of the second abnormal point.

6. The monitoring apparatus of claim 5, wherein the processor outputs the hypothesis when a node is further connected to the second downstream node.

* * * * *